Figure 1:
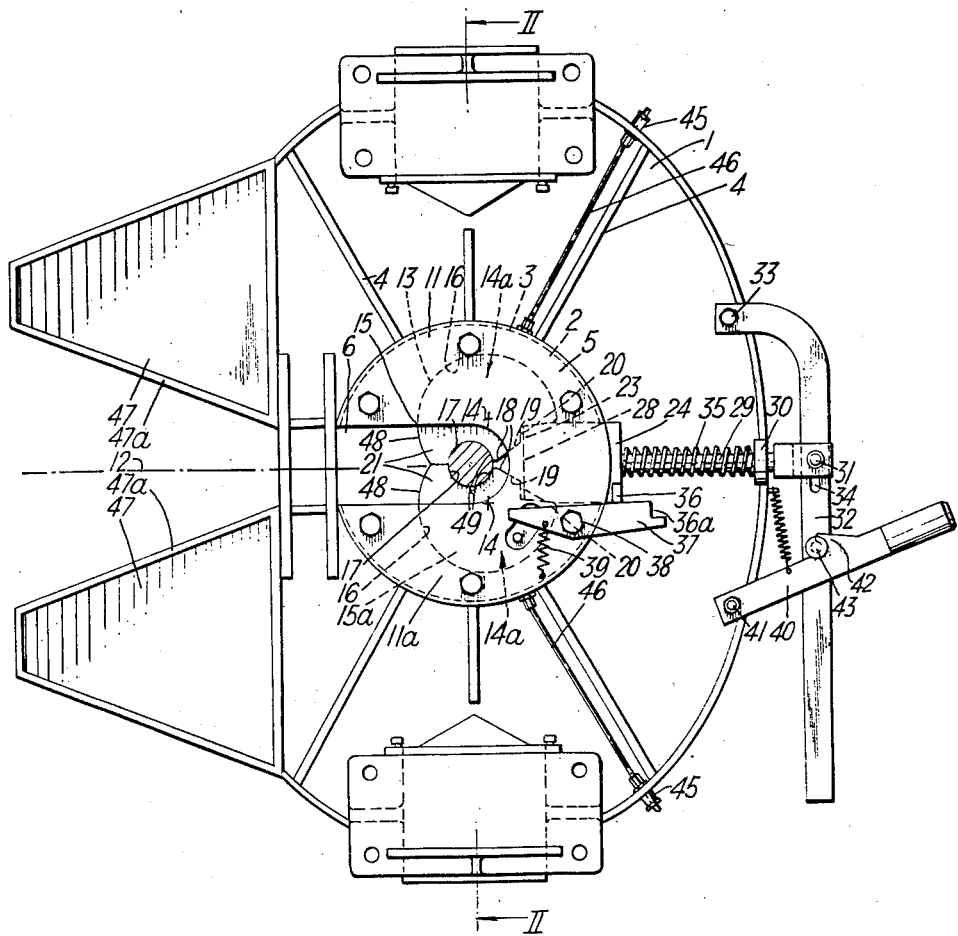

April 16, 1957 P. M. DAVIES 2,788,989
FIFTH WHEEL COUPLING FOR TRACTOR-TRAILER VEHICLES
Filed Jan. 20, 1955 2 Sheets-Sheet 1

Inventor
PHILIP M. DAVIES
By

Inventor
PHILIP M. DAVIES

United States Patent Office 2,788,989
Patented Apr. 16, 1957

2,788,989

FIFTH WHEEL COUPLING FOR TRACTOR-TRAILER VEHICLES

Philip Morey Davies, Ware, England

Application January 20, 1955, Serial No. 483,084

Claims priority, application Great Britain November 26, 1954

6 Claims. (Cl. 280—434)

This invention relates to vehicle towing couplings for securing trailers particularly heavy trailers to towing vehicles.

Heavy trailers are coupled to towing vehicles by coupling elements such as a tow bar which has a substantially vertical king-pin which is locked in a clamp secured to the rear of the towing vehicle in a manner which permits relative up and down and side to side movement between the trailer and the towing vehicle. Known clamping devices for such couplings consist of two jaws having opposed semi-circular jaws, hinged to the frame of an attachment secured to the towing vehicle, the jaws being pivoted about hinge pins to open and close round the tow bar king-pin and being clamped together by a sliding bolt which is moved between diverging faces of the jaws. In another known construction one jaw is fixed to the towing attachment and the other jaw is pivoted thereto about a hinge pin, a sliding bolt being provided on the attachment to engage and hold the hinged jaw in the locked position.

With these known locking jaws the hinge pins wear loose in the frame of the attachment which is usually a casting and the jaws themselves wear loose on the hinge pins so that the towing bar king-pin ceases to be securely held in the attachment.

The main object of the present invention is to provide a locking mechanism for such towing attachments which will exclude hinge or like pins and will provide larger bearing surfaces between the jaws and the towing attachment.

According to the present invention a towing attachment for clamping a trailer coupling element to a towing vehicle comprises a body for fixing to a towing vehicle, having a central elongated rearwardly directed channel therein, two opposed segmentally shaped cavities in said body symmetrically disposed one on each side of the channel and each opening on one side into the side of the channel, a pair of segmentally shaped jaw members freely and slidably disposed in each said cavity and arranged to slide freely with a rotary movement therein, a jaw in each said jaw member facing the open side of said cavity, said jaws being so disposed that when said jaw members are in the clamping position a coupling member on said trailer coupling element will be clamped in said jaws and said jaw members can slide rotatably and freely in said cavities to open said jaws for permitting entry and removal of said coupling members from said jaws, and a locking member for securing jaw members in the clamping position.

Preferably two opposed segmentally shaped cavities are provided in the body and disposed symmetrically one on either side of the central cut away portion and two segmentally shaped jaw members the radius of the circumference of each jaw member being the same as the radius of the side of the cavity in which it slides, said jaw members being freely and slidably mounted one in each of said cavities to rotate freely therein, said jaw members having opposing jaws disposed so that in the closed position the jaws will project into the U-shaped cut away portion and will engage and clamp between them a coupling member on said coupling element and in the open position will be located one in each cavity clear of the coupling element, and a locking member for locking said jaws members in the clamping position.

The locking member preferably consists of a plunger slidably arranged in the body in front of said jaw members and each sliding jaw member is provided with a slot arranged so that when the attachment is in the clamping position the slot or slots form a recess into which the plunger may be moved and secured to lock the jaw member or members in the clamping position.

Each jaw has a corresponding shape to the shape of the king-pin or like member on the towing element of the trailer.

The locking member, in the form of a plunger slidably arranged in the body which may be a single casting, is urged by a spring or like member, such as a balance weight, into the locking position; a lever may be pivotally connected to the body and pivoted to the plunger so that on operating the lever the plunger may be moved out of the slot in each jaw member against the action of the spring to enable the jaw member or members to be moved into the open position.

Figure 2:
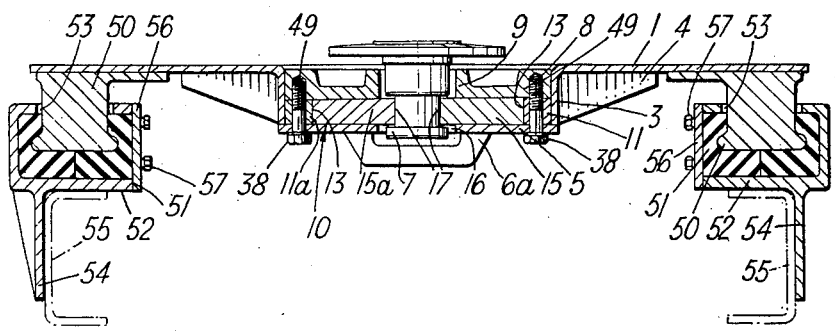
Figure 3:
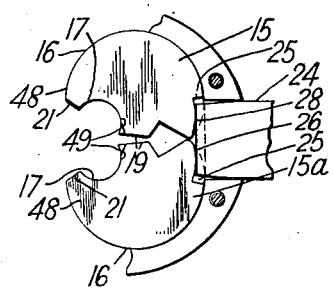

In order that the invention may be more clearly understood one construction in accordance therewith will now be described, by way of example, with reference to the accompanying drawings, in which:

Fig. 1 is an underside plan of a towing attachment for mounting on a towing vehicle, Fig. 2 is a cross-section on the line II—II of Fig. 1, looking in the direction of the arrows with a towing element king-pin engaged in the jaws, and Fig. 3 is a plan view of the jaw members and a part of the locking member shown in Fig. 1, but with the jaw members in the open position.

The same numerals are used throughout to indicate the same parts.

Referring to the drawings, the coupling attachment has a body 1 in the form of a casting or pressed metal frame having a central aperture 2 surrounded by a skirt 3 and the body may be reinforced by radial webs 4. The aperture is closed at the base of the skirt 3 by a plate 5 secured to the skirt in any suitable manner as by welding, the plate 5 having a U-shaped cut-away portion 6 to receive the free end of a coupling element such as a tow bar secured to the trailer, on which a king-pin 7 is secured. The mouth of the cut-away portion 6 may be reinforced by a transom 6a.

A top plate 8, having a U-shaped recess or cut-away portion 9 similar to the cut-away portion 6, is secured in the aperture 2 or cast integral with the body 1, the portions 6 and 9 being disposed one above the other. The central space 10 between the plates 5 and 8 is partially filled by bearing members 11, 11a, one on either side of the longitudinal centre line 12 of the body. The internal vertical wall 13 of each of the bearing member 11, 11a, is circular in contour, its centre of curvature 14 being in or near the vertical plane through the sides of the portions 6 and 9. Thus segmentally shaped bearing cavities 14a are formed one on each side of the centre line 12 and bounded by the underside of the plate 8, the top side of the plate 5 and the wall 13.

Within each cavity 14a is a segmentally shaped jaw member 15, 15a respectively, each jaw member having a periphery 16 forming part of a circle so that it can rotate freely with a sliding motion in its cavity in the horizontal plane. Each jaw member has a jaw 17 with its side 18 tapering to the rear as at 19; the tapered side 19 terminates in a slot 20.

In Fig. 1 the jaw members are shown in the clamping position so that their noses 21 engage round the king-pin 7 (Fig. 2) on the trailer coupling (not shown). In this position the slots 20 form a recess 23 which receives a locking plunger 24 which prevents the jaws opening. The plunger 24 and the slots 20 may be tapered rearwardly so that by forcing the plunger 24 firmly into the recess the jaw members are firmly locked against rotary movement.

When the plunger 24 is withdrawn from the recess the jaw members 15, 15a are free to slide round in the bearing cavities in contact with the walls 13 to open the jaws as shown in Fig. 3. Cut-away portions 25 (Fig. 3) may be provided in the jaw members but extending only partially through the thickness of the jaw members. The front end of the plunger 24 has a corresponding lip 26 which engages in the cut-away portions 25 when the jaw members are in the open position so that the end 28 of the plunger 24 bears against the ends of the cut-away portions 25 to hold the jaw members against closure.

The plunger 24 is carried on a rod 29 which is slidably arranged in a bearing 30 on the body 1. The rod 29 is pivotally connected by a pin 31 to a lever 32 in turn pivoted to the body on a pin 33. The pin 32 slides in a slot 34 in the lever 32 so that as the lever is moved about the pin 33 the pin 31 will slide in the slot 34 whereby the rod 29 will move longitudinally of the body. A spring 35 is arranged on the rod 29 normally to urge the rod into the slots 20. The plunger 24 has a lug 36 arranged so that, when the plunger is fully withdrawn from the slots 20 against the action of the spring 35, it will engage in a cut-away portion 36a on a locking lever 37 pivoted on a bolt 38 to the plate 5 and urged by a spring 39 towards the bolt.

A second locking lever 40 pivoted on a pin 41 to the body 1 has a catch 42 adapted to engage over a pin 43 on the lever 32 to lock the lever 32 in the clamping position so that the plunger 24 is pressed firmly in the slots 20. A spring 44 urges the lever 40 into this locking position.

To reduce friction between the jaw members 15, 15a and the top plate 8, the bottom plate 5 and the walls 13, grease nipples 45 are fixed to the body 1 communicating through pipes 46 to the cavities 14, 14a.

The body has rearwardly directed plates 47 with diverging inner walls 47a which serve to direct the king-pin 7 into the U-shaped slots 6 and 9 during the coupling operation.

In operation the lever 40 is moved to free its catch 42 from the pin 43 and the lever 32 is drawn rearwardly until the lug 36 engages the cut-away portion 36a. The trailer is then manoeuvred to push the king-pin against the front faces 48 of the jaw members 15, 15a which being curved are forced apart causing them to rotate in the cavities 14a so that the king-pin can be pushed between the open jaws 17. As the king-pin strikes the rear faces 49 of the jaws it causes the jaw members 15, 15a to rotate back to the closed position, when the plunger 24 is released from the lever 40 and the spring 35 forces the plunger into the slots 20 to lock the jaws and clamp the king-pin. The lever 32 is then relocked in the clamping position by the catch 42 being forced over the pin 43.

In the construction shown in Figure 2 the plate 5 is held in place on the body by bolts 38 which pass through the bearing members 11, 11a and are screwed into threaded bores 49 in the plate 8.

If it is desired to clamp the jaw members 15, 15a in the open position the plunger is not withdrawn far enough to allow the lug 36 to engage the cut-away portion 36a so that the spring 35 is free to urge the lip 26 of the plunger to engage the cut-away portions 25.

With a coupling attachment according to the invention the use of bearing pins is avoided while the bearing faces of the jaw members against the walls 13 have a much greater bearing surface than with the bearing pins used hitherto, thus greatly reducing the wear of the bearing surfaces. Further there are no bearing pins to shear and the jaw members spread the load over a large bearing face area and reduce the shearing forces acting on the jaw members.

If desired the bearing faces on the walls 13 and on the jaw members may be case hardened or otherwise treated to increase their resistance to wear.

For mounting the attachment on the vehicle, the body 1 has two blocks 50 one on each side embedded in resilient blocks 51 of rubber, for example, which are gripped in housings 52. Each block 50 passes through an aperture 53 in the top of the housing 52, the aperture 53 being of greater diameter than the block 50 to permit the block to vibrate longitudinally, transversely and vertically and thus damp shocks transmitted in travel on the road through the vehicle chassis.

The housings 52 have flanges 54 connected to the chassis members 55 of the towing vehicle as by bolts. The blocks 51 may be compressed in the housings 52 by plates 56 which are pressed against the blocks 51 by bolts 57.

Alternatively the body 1 may be secured to the towing vehicle chassis by means of known trunnion pins passing through bearings in the housings 52 and the chassis members 55, suitable bearings being inserted between the trunnion pins and the chassis members. The construction of the blocks 50 embedded in the resilient blocks 51 is however preferred as this avoids the use of trunnion pins which are liable to wear in use.

I claim:

1. A towing attachment for clamping a trailer coupling element to a towing vehicle comprising a body for fixing to a towing vehicle, having a central elongated rearwardly directed channel therein, two opposed segmentally shaped cavities in said body symmetrically disposed one on each side of the channel and each opening on one side into the side of the channel, a pair of segmentally shaped jaw members freely and slidably disposed in each said cavity and arranged to slide freely with a rotary movement therein, a jaw in each said jaw member facing the open side of said cavity, said jaws being so disposed that when said jaw members are in the clamping position a coupling member on said trailer coupling element will be clamped in said jaws and said jaw members can slide rotatably and freely in said cavities to open said jaws for permitting entry and removal of said coupling members from said jaws, and a locking member for securing jaw members in the clamping position.

2. A towing attachment for clamping a trailer coupling element to a towing vehicle comprising a body for fixing to a towing vehicle having a central rearwardly directed U-shaped cut away portion therein, two opposed segmentally shaped cavities in said body symmetrically disposed one on either side of the central cut away portion and two segmentally shaped jaw members the radius of the circumference of each jaw member being the same as the radius of the side of the cavity in which it slides, said jaw members being freely and slidably mounted one in each of said cavities to rotate freely therein, said jaw members having opposing jaws disposed so that in the closed position the jaws will project into the U-shaped cut away portion and will engage and clamp between them a coupling member on said coupling element and in the open position will be located one in each cavity clear of the coupling element, and a locking member for locking said jaw members in the clamping position.

3. A towing attachment according to claim 1 wherein the locking member consists of a plunger slidably arranged in the body in front of said jaw members and each sliding jaw member is provided with a slot arranged so that when the attachment is in the clamping position the slot or slots form a recess into which the plunger may be moved and secured to lock the jaw member or members in the clamping position.

4. A towing attachment according to claim 1 wherein the locking member comprises a plunger slidably disposed in said body and is pivotally connected to an operating member in turn pivoted to the body, a spring being provided to urge the locking member into the clamping position, the jaw members have cut-away portions at their forward portions with which the plunger engages under the action of the spring to hold the jaw members in the clamping position, and each of said jaw members has a recess in its circumference extending away from said cut away portions therein in which said plunger engages to clamp said jaw members in the open position.

5. A towing attachment according to claim 1 wherein the body consists of a frame or casting having a central aperture closed by two spaced substantially horizontal plates having rearwardly facing U-shaped cut-away portions forming said channel and a bearing member having a circular inner edge is disposed between the two plates, the spaces on each side of said U-shaped cut away portion bounded by said bearing member and the plates forming the bearing cavities for said jaw members.

6. A towing attachment according to claim 2 wherein the body has two blocks one on either side, each block being secured to a resilient block gripped in a housing which is adapted to be secured to the towing vehicle chassis, whereby the attachment is cushioned against vibrations in the chassis.

References Cited in the file of this patent

UNITED STATES PATENTS

| | | |
|---|---|---|
| 1,946,167 | Lubbers | Feb. 6, 1934 |
| 2,077,484 | King | Apr. 20, 1937 |
| 2,102,821 | Seyferth | Dec. 21, 1937 |
| 2,411,404 | Winn | Nov. 19, 1946 |
| 2,459,772 | Kinne | Jan. 18, 1949 |